(12) United States Patent
Sasaki et al.

(10) Patent No.: US 11,988,293 B2
(45) Date of Patent: May 21, 2024

(54) VALVE AND PACKAGE PROVIDED WITH THE SAME

(71) Applicant: DAI NIPPON PRINTING CO., LTD., Tokyo (JP)

(72) Inventors: Miho Sasaki, Tokyo (JP); Atsuko Takahagi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 510 days.

(21) Appl. No.: 17/285,016

(22) PCT Filed: Oct. 15, 2019

(86) PCT No.: PCT/JP2019/040368
§ 371 (c)(1),
(2) Date: Apr. 13, 2021

(87) PCT Pub. No.: WO2020/080325
PCT Pub. Date: Apr. 23, 2020

(65) Prior Publication Data
US 2021/0341068 A1     Nov. 4, 2021

(30) Foreign Application Priority Data
Oct. 15, 2018    (JP) ................................ 2018-194191

(51) Int. Cl.
*H01M 50/342*      (2021.01)
*B65D 77/22*      (2006.01)
(Continued)

(52) U.S. Cl.
CPC .......... *F16K 17/048* (2013.01); *B65D 77/225* (2013.01); *F16K 17/16* (2013.01); *H01M 50/3425* (2021.01); *F16K 17/0406* (2013.01)

(58) Field of Classification Search
CPC ................................................ H01M 50/3425
See application file for complete search history.

(56) References Cited

U.S. PATENT DOCUMENTS

2005/0151514 A1    7/2005   Kozu et al.
2011/0104532 A1*   5/2011   Buck ................... H01M 50/325
                                                                 429/82
(Continued)

FOREIGN PATENT DOCUMENTS

JP       S59-166363 U    11/1984
JP       2004-006213 A    1/2004
(Continued)

OTHER PUBLICATIONS

Nov. 19, 2019 Search Report issued in International Patent Application No. PCT/JP2019/040368.
(Continued)

*Primary Examiner* — Olatunji A Godo
(74) *Attorney, Agent, or Firm* — Oliff PLC

(57) ABSTRACT

A valve for forming a passage through an inside and an outside of a packaging container constituted by resin molded articles or films are in communication with each other includes a breakable valve that's arranged to block the passage and splits open when internal pressure of the packaging container increases due to gas generated inside the packaging container, a check valve that's arranged on a secondary side located on an outer side to the breakable valve in the passage and through which the gas is discharged from the inside of the packaging container to the outside thereof according to internal pressure of the packaging container after the breakable valve has split open, and an attachment portion that delimits at least a portion of the passage and is fixed to the packaging container in a state of being sandwiched between the resin molded articles or the films constituting the packaging container.

19 Claims, 5 Drawing Sheets

(51) Int. Cl.
*F16K 17/04* (2006.01)
*F16K 17/16* (2006.01)

(56) References Cited

U.S. PATENT DOCUMENTS

| | | |
|---|---|---|
| 2016/0020452 A1 | 1/2016 | Choi et al. |
| 2016/0036024 A1 | 2/2016 | Choi et al. |
| 2016/0214780 A1 | 7/2016 | Kazuhiro et al. |

FOREIGN PATENT DOCUMENTS

| | | |
|---|---|---|
| JP | 2006-040626 A | 2/2006 |
| JP | 2015-048143 A | 3/2015 |
| JP | 2016-025083 A | 2/2016 |
| JP | 2016-031934 A | 3/2016 |
| JP | 2016-219387 A | 12/2016 |

OTHER PUBLICATIONS

Nov. 19, 2019 Written Opinion issued in International Patent Application No. PCT/JP2019/040368.

* cited by examiner

VALVE AND PACKAGE PROVIDED WITH THE SAME

TECHNICAL FIELD

The present invention relates to a valve for a packaging container, and a package provided with the same.

BACKGROUND ART

JP 2004-006213A (Patent Literature 1) discloses an invention relating to a battery pack of a square battery. This battery pack includes a metal battery can in which power generating elements are sealed. Gas may be generated inside the battery can due to vaporization or decomposition of an electrolytic solution, and an abnormal increase in internal pressure of the battery can caused by the generated gas may lead to the battery can rupturing. In order to prevent such a rupture, the battery can disclosed in Patent Literature 1 is provided with a safety valve. The safety valve is configured such that it is broken by internal pressure that is lower than the internal pressure at which the battery can ruptures, and thus the generated gas is discharged through the safety valve.

CITATION LIST

Patent Literature

Patent Literature 1: JP 2004-006213A

SUMMARY OF INVENTION

Technical Problem

It is not possible to continuously use the battery can disclosed in Patent Literature 1 once a breakable valve has split open. Not only battery cans but also packaging containers containing a gas-generating content may have such a problem.

The present invention is directed to provide a valve for a packaging container that can be continuously used even after a breakable valve has split open, and a package provided with the same.

Solution to Problem

A valve according to a first aspect of the present invention is a valve for forming a passage through which inside and outside of a packaging container constituted by resin molded articles or films are in communication with each other, and includes a breakable valve that is arranged so as to block the passage and split open when internal pressure of the packaging container increases due to gas generated inside the packaging container, a check valve that is arranged on a secondary side located on an outer side with respect to the breakable valve in the passage and through which the gas is discharged from the inside of the packaging container to the outside thereof according to internal pressure of the packaging container after the breakable valve has split open, and an attachment portion that delimits at least a portion of the passage and is fixed to the packaging container in a state of being sandwiched between the resin molded articles or the films constituting the packaging container. It should be noted that the attachment portion is typically fixed to the packaging container through heat-sealing in a state of being sandwiched between the resin molded articles or the films constituting the packaging container.

A valve according to a second aspect of the present invention is the valve according to the first aspect, wherein valve-opening pressure for the breakable valve is lower than or equal to two-thirds of withstanding internal pressure of the packaging container.

A valve according to a third aspect of the present invention is the valve according to the first aspect or the second aspect, and further includes a tubular portion that is arranged outside the packaging container, is continuous with the attachment portion, and delimits another portion of the passage. The check valve is arranged inside the tubular portion.

A package according to a fourth aspect of the present invention includes the valve according to any one of the first aspect to the third aspect, and the packaging container.

A package according to a fifth aspect of the present invention is the package according to the fourth aspect, wherein the packaging container is a pouch.

A package according to a sixth aspect of the present invention is the package according to the fourth aspect or the fifth aspect, wherein the packaging container has a withstanding internal pressure of 1 MPa or less.

A package according to a seventh aspect of the present invention is the package according to any one of the fourth aspect to the sixth aspect, wherein inside of the packaging container is substantially maintained under vacuum until the breakable valve has split open.

A package according to an eighth aspect of the present invention is the package according to any one of the fourth aspect to the seventh aspect, wherein the packaging container contains a battery element.

A package according to a ninth aspect of the present invention is the package according to any one of the fourth aspect to the eighth aspect, wherein the packaging container is a laminated container.

Advantageous Effects of the Invention

With the present invention, the check valve is arranged on the secondary side located on the outer side with respect to the breakable valve. Accordingly, continuous use is possible even after the breakable valve has split open.

DESCRIPTION OF EMBODIMENTS

Hereinafter, a valve according to an embodiment of the present invention and a package provided with the same will be described with reference to the drawings.

1. OVERALL CONFIGURATION OF PACKAGE

Figure 1:
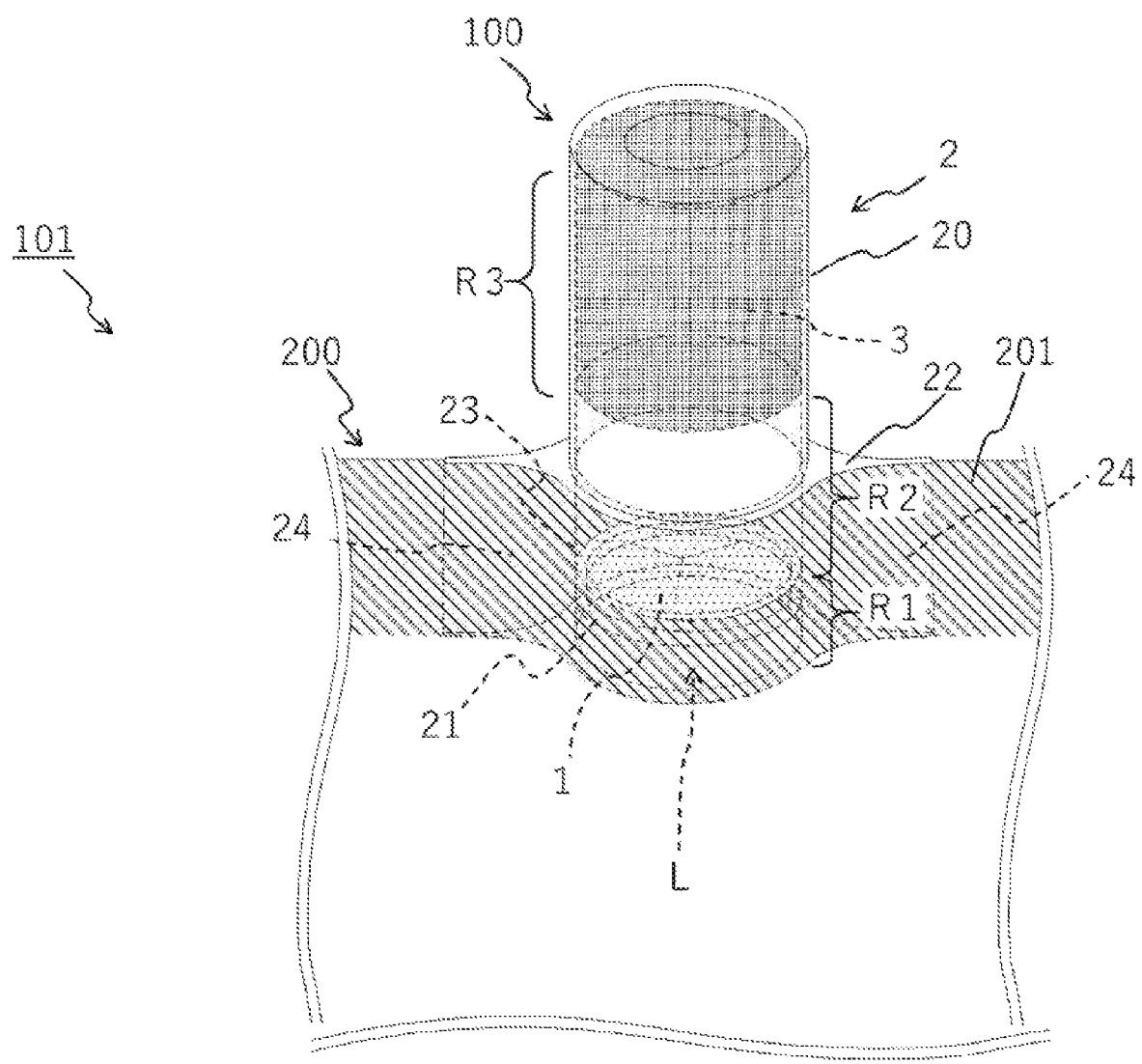
FIG. 1 is a perspective view of a package including a valve (valve structure) according to an embodiment of the present invention and a packaging container.

FIG. 1 is a perspective view of a package 101 according to this embodiment. As shown in FIG. 1, the package 101 includes a valve structure 100, which is a valve according to this embodiment, and a packaging container 200 to which the valve structure 100 is attached. In FIG. 1, for reference, portions that cannot be visually confirmed from the outside under ordinary conditions are partially shown by dotted lines. For illustrative reasons, the vertical direction and the horizontal direction in FIG. 1 refer to a "vertical direction" and a "horizontal direction", respectively, in the description below, but the orientation and the direction of the package 101 during use are not limited thereto.

Although there is no particular limitation on a content of the package 101, the package 101 is particularly excellent for containing content that generates gas over time. Examples of the content of the package 101 include coffee, fermented foods (e.g., miso), and foods with a long shelf life, but the package 101 of this embodiment is a battery, especially a lithium-ion secondary battery, and contains battery elements such as electrodes and an electrolytic solution as contents thereof.

The packaging container 200 is constituted by a resin molded article or a film. The "resin molded article" as used herein can be manufactured using a technique such as injection molding, air-pressure molding, vacuum molding, or blow molding, and in-mold molding may also be employed in order to impart a design and functionality thereto. Examples of the type of resin include PP, PET, nylon, and ABS. The "film" as used herein is a plastic film or a metal foil that can be manufactured using a technique such as an inflation method or a T-die method, for example. The "film" as used herein may be a stretched film or unstretched film, and may be a single-layer film or multi-layer film. The "multi-layer film" as used herein may be manufactured using a coating method, manufactured by bonding a plurality of films using an adhesive or the like, or manufactured using a multi-layer extruding method.

In this embodiment, the packaging container 200 is a laminated container. A laminated container is constituted by a laminated film as the name implies. There is no particular limitation on the shape of the laminated container, and the laminated container can also be formed in a bag-like shape. In this embodiment, a laminated film is molded into a recessed shape, another laminated film is stacked thereon, appropriate portions (peripheral portions) thereof are heat-sealed, and thus a heat-sealed portion 201 is formed. This heat-sealed portion 201 forms the interior space of the packaging container 200 that is secluded from the exterior space. It should be noted that examples of the heat-sealing technique performed herein includes techniques such as heat welding using heat from a heat source and ultrasonic welding. A laminate obtained by stacking a base material layer, a barrier layer, and a heat-sealable resin layer in this order can be used as the laminated film.

The valve structure 100 is configured such that gas generated inside the packaging container 200 is discharged to the outside as needed to prevent the packaging container 200 from rupturing due to increased internal pressure. In the description below, a side close to the inside of the packaging container 200 with respect to the valve structure 100 is referred to as a "primary side", and a side opposite to the primary side (i.e., a side close to the outside of the packaging container 200) with respect to the valve structure 100 is referred to as a "secondary side".

2. CONFIGURATION OF VALVE STRUCTURE

As shown in FIG. 1, the valve structure 100 includes a valve outer body 2 inside which a passage L is formed. The valve outer body 2 includes a tubular portion 20 and an attachment portion 22. The attachment portion 22 is a portion for attaching the valve structure 100 to the packaging container 200. In this embodiment, the attachment portion 22 is fixed to the packaging container 200 through heat-sealing in a state of being sandwiched between the laminated films so as to form the heat-sealed portion 201 when the packaging container 200 having a bag-like shape is formed.

The attachment portion 22 includes an annular portion 23 that is substantially concentric with the tubular portion 20, and wing-like extended end parts 24 that respectively extend toward the left and right sides from the left and right end parts of the annular portion 23, and has a teary eye shape in a plan view. The tubular portion 20 is a substantially cylindrical portion that extends upward from the upper end of the attachment portion 22. In this embodiment, the tubular portion 20 and the attachment portion 22 are made of a metal such as stainless steel, and are molded as separate components and then welded to each other, but there is no limitation to this configuration. However, the tubular portion 20 and the attachment portion 22 can also be formed in one piece. It should be noted that, when the attachment portion 22 and the tubular portion 20 are formed as separate components, materials thereof may be different. For example, the tubular portion 20 may be made of stainless steel, and the attachment portion 22 may be made of a hard resin. The passage L is a passage with a substantially circular cross section that penetrates inside the attachment portion 22 and the tubular portion 20 and extends in the vertical direction. The inside and the outside of the packaging container 200 are in communication with each other through the passage L.

In the passage L, a flange portion 21 is formed on the inner circumferential surface of the attachment portion 22, and the upper surface of the flange portion 21 is welded to the outer circumferential edge of a breakable valve 1. The breakable valve 1 is made of a metal and has a substantially disk shape. The breakable valve 1 is arranged so as to block the passage L. The flange portion 21 is an internal flange, and the outer diameter of the breakable valve 1 is larger than the inner diameter of the flange portion 21 and is slightly smaller than the inner diameters of portions of the attachment portion 22 other than the flange portion 21. It should be noted that the breakable valve 1 may also be fixed to the lower surface of the flange portion 21.

The breakable valve 1 is configured such that, when the pressure on the primary side thereof increases, the breakable valve 1 splits open and thus gas is discharged from the space on the primary side to the space on the secondary side. That is, the breakable valve 1 is configured to split open when the internal pressure of the packaging container 200 increases due to gas generated inside the packaging container 200. It should be noted that, in the state shown in FIG. 1, the breakable valve 1 does not split open and is in a closed state.

A space R1 on the primary side of the breakable valve 1 in the passage L is in communication with the inside of the packaging container 200, and the internal pressure of the packaging container 200 is the same as the internal pressure of the space R1. The space R1 on the primary side and the inside of the packaging container 200 form a closed space in which gas generated inside the packaging container 200 is first sealed.

Figure 2A:
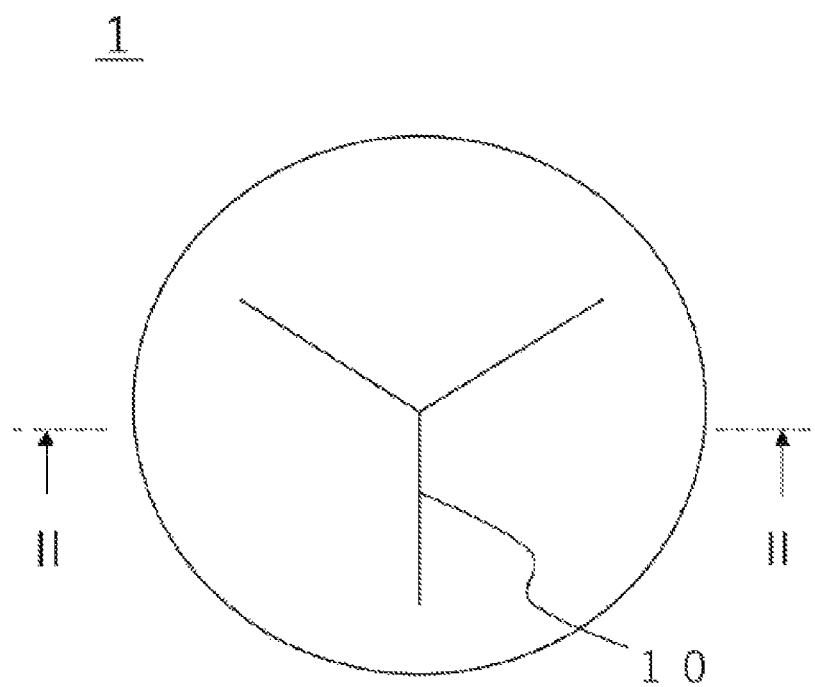
FIG. 2A is a top view of a breakable valve according to the embodiment.
Figure 2B:
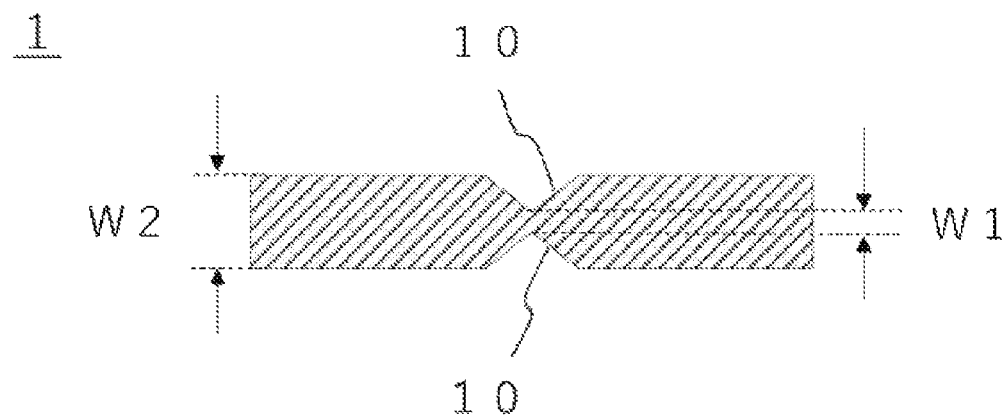
FIG. 2B is a cross-sectional view taken along line II-II in FIG. 2A.

FIG. 2A is a top view of the breakable valve 1. The upper surface of the breakable valve 1 is provided with a score 10 formed by scoring the upper surface in a substantially Y-shape. FIG. 2B is a cross-sectional view of the breakable valve 1 taken along line II-II. As shown in FIG. 2B, the scores 10 are symmetrically formed on the upper surface and the lower surface of the breakable valve 1, and a thickness W1 of the portion provided with the scores 10 is smaller than a thickness W2 of the other portion of the breakable valve 1. That is, the strength of the portion provided with the scores 10 is relatively lower than that of the other portion of the breakable valve 1, and stress concentrates on that portion when the pressure on the primary side of the breakable valve 1 increases. Accordingly, when pressure higher than or equal to a certain level of pressure is applied to the breakable valve 1 as the internal pressure of the packaging container 200 increases, breakage starts from the portion provided with the scores 10, and then the breakable valve 1 splits open. The valve-opening pressure for the breakable valve 1 is pressure at which the breakable valve 1 splits open (i.e., a difference between pressure on the primary side and pressure on the secondary side), and can be realized as appropriate by adjusting the parameters such as the shape of the scores 10, the thickness W1, and the material. It should be noted that the term "split open" as used herein refers to bringing about a state in which the material constituting the breakable valve 1 is cut and thus gas and liquid can flow between the primary side and the secondary side of the breakable valve 1.

The breakable valve 1 of this embodiment is made of aluminum and has a W1 of 10 to 20 (μm) and a W2 of about 200 (μm). The valve-opening pressure for the breakable valve 1 of this embodiment is 0.2 (MPa). It should be noted that the "valve-opening pressure" as used herein is represented as a value obtained by subtracting pressure on the secondary side of the breakable valve 1, which is considered as atmospheric pressure (0.1 MPa), from pressure on the primary side thereof. When represented as a numerical value, pressure is measured under an environment of 25° C. unless otherwise stated. It is preferable that the valve-opening pressure for the breakable valve 1 is lower than or equal to two-thirds of the withstanding internal pressure of the packaging container 200. In this case, the breakable valve 1 can be more reliably opened before the packaging container 200 ruptures. It should be noted that the withstanding internal pressure of the packaging container 200 refers to the maximum limit of internal pressure at which a packaging container 200 can maintain a hermetically sealed state, when the valve structure 100 is omitted and the area around the position at which the valve structure 100 is to be attached is similarly heat sealed. Here, the internal pressure of the packaging container 200 is represented as a difference from atmospheric pressure. The withstanding internal pressure of the packaging container 200 can be set to 1 (MPa) or less. In this case, defects of internal components of a battery due to a large amount of gas generated inside the packaging container 200 can be suppressed. When the withstanding internal pressure of the packaging container 200 is greater than 1 MPa under a high-temperature environment of 100° C., it is preferable that the valve-opening pressure for the breakable valve 1 is lower than or equal to two-thirds of 1 MPa. The reason for this is that, if the valve-opening pressure for the breakable valve 1 is higher than two-thirds of 1 MPa, the electrodes are deformed due to deformation of the packaging container 200 even if the packaging container 200 is not broken, and thus a problem such as a short circuit arises.

In the passage L, a check valve 3 is arranged on the secondary side of the breakable valve 1. The check valve 3 is a one-way valve through which gas is discharged from the inside of the packaging container 200 to the outside thereof according to the internal pressure of the packaging container 200 after the breakable valve 1 has split open. The check valve 3 is a recoverable valve that can be repeatedly used to discharge gas.

Figure 3:
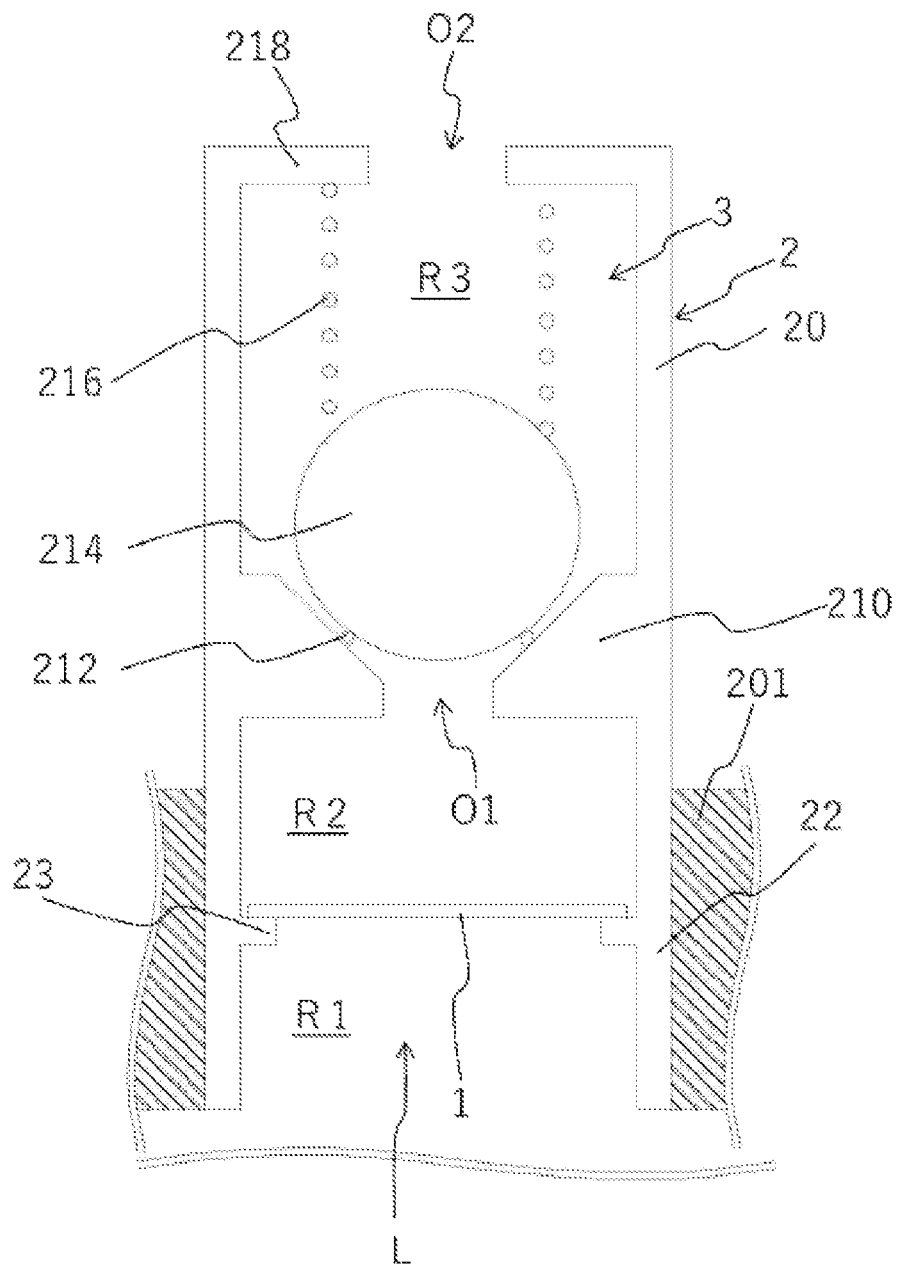
FIG. 3 is a cross-sectional side view showing the structure of the vicinity of the breakable valve and a check valve according to the embodiment.

FIG. 3 is a cross-sectional side view showing the structure of the vicinity of the breakable valve 1 and the check valve 3. As shown in FIG. 3, gas generated inside the packaging container 200 is guided to the check valve 3 through the passage L after the breakable valve 1 has split open. There is no particular limitation on the configuration of the check valve 3. In this embodiment, as shown in FIG. 3, the check valve 3 is of a ball-spring type, but a duckbill type, an umbrella type, and the like can also be used. The check valve 3 of this embodiment includes a valve seat 210, an O-ring 212, a ball 214, a spring 216, and a top panel portion 218.

The valve seat 210 is arranged to protrude from the inner circumferential surface of the tubular portion 20 toward the inside of the passage L. A through hole O1 that delimits a space having an inverted cone shape whose diameter increases upward in the passage L and through which the above-mentioned space is in communication with a space R2 on the secondary side of the breakable valve 1 is formed at the center of the valve seat 210. The valve seat 210 receives the ball 214 serving as a valve body that is biased from above by the spring 216, and the check valve 3 is brought into a closed state at this time. The ball 214 is in contact with the lower end of the spring 216, and the upper end of the spring 216 is in contact with the top panel portion 218. The top panel portion 218 is a portion that is arranged at the upper end of the tubular portion 20 and has a doughnut-like plate shape provided with a through hole O2 at the center thereof. It should be noted that the valve seat 210 and the top panel portion 218 can be made of a metal such as stainless steel, for example, and can be formed as one piece with the tubular portion 20. When the ball 214 lands on the valve seat 210, the O-ring 212 serves to fill the gap between the ball 214 and the valve seat 210, and assists the improvement in the airtightness of the closed state. The O-ring 212 is a hollow annular ring and is made of fluororubber, for example. There is no particular limitation on the materials of the ball 214 and the spring 216, and these two components can be made of a metal such as stainless steel, for example. The ball 214 may also be made of a resin. A configuration can also be employed in which one of the ball 214 and the valve seat 210 is made of rubber and the other is made of Teflon (registered trademark) or a metal such as stainless steel that is coated with Teflon (registered trademark). It should be noted that the ball 214 typically has a spherical shape, but need not necessarily have a spherical shape as long as the valve function is exhibited. For example, the ball 214 may have a hemispherical shape, a prolate shape, or an oblate shape. Moreover, when the ball 214 has a hemispherical shape, for example, a columnar member may extend from the flat surface of the hemisphere.

After the breakable valve 1 has split open, the space R2 on the secondary side of the breakable valve 1 and on the primary side of the check valve 3 in the passage L is in communication with the space R1 on the primary side of the breakable valve 1. At this time, the internal pressure of the space R2 is the same as the internal pressure of the packaging container 200 and the internal pressure of the space R1. The space R2, the inside of the packaging container 200, and the space R1 form a closed space in which gas generated inside the packaging container 200 is sealed after the breakable valve 1 has split open.

Moreover, in the passage L, a space R3 on the secondary side (i.e., a side close to the outside of the packaging container 200 with respect to the position at which the valve seat 210 and the ball 214 come into contact with each other) of the check valve 3 is in communication with the exterior space. When the internal pressure of the packaging container 200, namely the internal pressure of the space R2 on the primary side of the check valve 3, reaches a predetermined pressure after the breakable valve 1 has split open, gas guided from the inside of the packaging container 200 presses the ball 214 upward. When the ball 214 is pressed and thus leaves the valve seat 210, the spring 216 is compressed, and thus the check valve 3 is brought into an open state. In this open state, gas generated inside the packaging container 200 flows into the space R3 through a gap formed between the ball 214 and the O-ring 212, and is then discharged to the outside of the package 101 through the through hole O2. When the gas is discharged and thus the force with which the ball 214 is pressed upward decreases, force with which the ball 214 is biased downward by the spring 216 becomes larger than the above-mentioned force, and the spring 216 stretches and recovers. As a result, the check valve 3 is brought into a closed state again.

The valve-opening pressure for the check valve 3 can also be set to be lower than the valve-opening pressure for the breakable valve 1, the same as the valve-opening pressure for the breakable valve 1, or higher than the valve-opening pressure for the breakable valve 1. It should be noted that, as in the case of the breakable valve 1, the "valve-opening pressure for the check valve 3" as used herein is also represented as a value obtained by subtracting pressure on the secondary side of the check valve 3, which is considered as atmospheric pressure (0.1 MPa), from pressure on the primary side thereof.

As described above, in this embodiment, the check valve 3 is arranged on the secondary side of the breakable valve 1. Accordingly, even after the breakable valve 1 has split open, the check valve 3 functions to prevent air from entering the packaging container 200 and thus effectively prevent the battery from being deteriorated due to water contained in the air. Therefore, even after the breakable valve 1 has split open, the package 101 serving as a battery can be continuously used.

Incidentally, although it can be said that the check valve 3 is a one-way valve, it is not possible to completely prevent backflow using only the check valve 3. Accordingly, it is difficult to completely prevent air from entering the packaging container 200 using only the check valve 3, and the battery may be deteriorated. In this regard, in this embodiment, before the breakable valve 1 splits open, the presence of the breakable valve 1 makes it possible to completely prevent air from entering the packaging container 200 and thus effectively prevent the battery from being deteriorated due to water contained in the air.

The breakable valve 1 splits open when the internal pressure of the packaging container 200 is higher than or equal to the valve-opening pressure for the breakable valve 1. Accordingly, after the breakable valve 1 has split open, the internal pressure of the space R1 on the primary side of the check valve 3 is kept at a relatively higher level, and therefore, even slight backflow via the check valve 3 is less likely to be generated. Accordingly, even after the breakable valve 1 has split open, it is possible to prevent air from entering the packaging container 200 and thus effectively prevent the battery from being deteriorated due to water contained in the air.

Furthermore, the package 101 of this embodiment is a battery, and the inside of the packaging container 200 is substantially maintained under vacuum until the breakable valve 1 splits open. In this case, if a configuration is employed in which the breakable valve 1 is omitted and only the check valve 3 is provided, it is difficult to create a vacuum in the packaging container 200 due to the air backflow problem as described above. In this regard, in this embodiment, the presence of the breakable valve 1 makes it easy to create a vacuum as mentioned above.

Furthermore, in this embodiment, the check valve 3 is not arranged on the attachment portion 22 but arranged inside the tubular portion 20. As a result, a risk that various components included in the check valve 3 are deformed due to heat generated when performing heat-sealing to attach the attachment portion 22 to the packaging container 200 is reduced.

3. OPERATIONS OF VALVE STRUCTURE

Hereinafter, the usage state of the valve structure 100 will be described. The valve structure 100 is used in a state of being hermetically attached to the packaging container 200.

As described above, the package 101 is a battery, and the packaging container 200 contains an electrolytic solution. The electrolytic solution may be vaporized or decomposed due to any cause. When gas is generated inside the packaging container 200 due to vaporization or decomposition of the electrolytic solution, the internal pressure of the space R1 increases. When the internal pressure of the space R1 (difference in pressure from the space R2) increases to the valve-opening pressure for the breakable valve 1, the breakable valve 1 splits open. After the breakable valve 1 has split open, the space R1 and the space R2 are in communication with each other, and the gas can flow into the space R2, which is originally a closed space. As a result, the internal pressure applied to the packaging container 200 decreases.

Once the breakable valve 1 splits open, its functions are lost. However, since the check valve 3 is provided on the secondary side of the breakable valve 1, the inside and the outside of the packaging container 200 are not in communication with each other, and the state in which air and water contained in the air are less likely to enter the packaging container 200 continues. Therefore, even after the breakable valve 1 has split open, the package 101 serving as a battery can be continuously used.

Thereafter, when the package 101 serving as a battery is continuously used, and then the internal pressure of the space R1 and the internal pressure of the space R2 (difference in pressure from the space R3) reach the valve-opening pressure for the check valve 3, the check valve 3 is opened. When the check valve 3 is opened, the spaces R1 and R2 are further in communication with the exterior space via the space R3. That is, the inside and the outside of the package 101 are in communication with each other, and gas generated inside the packaging container 200 is discharged to the exterior space. As a result, the internal pressure applied to the packaging container 200 decreases, and thus the check valve 3 returns to a closed state. Accordingly, the state in which air and water contained in the air are less likely to enter the packaging container 200 further continues, and thus the package 101 serving as a battery can be continuously used.

4. MODIFIED EXAMPLES

Although an embodiment of the present invention has been described above, the present invention is not limited to the embodiment above, and various modifications can be carried out without departing from the gist of the invention. For example, the following modifications can be carried out. Moreover, the key points of the following modified examples can be combined as appropriate.

4-1

Figure 4A:
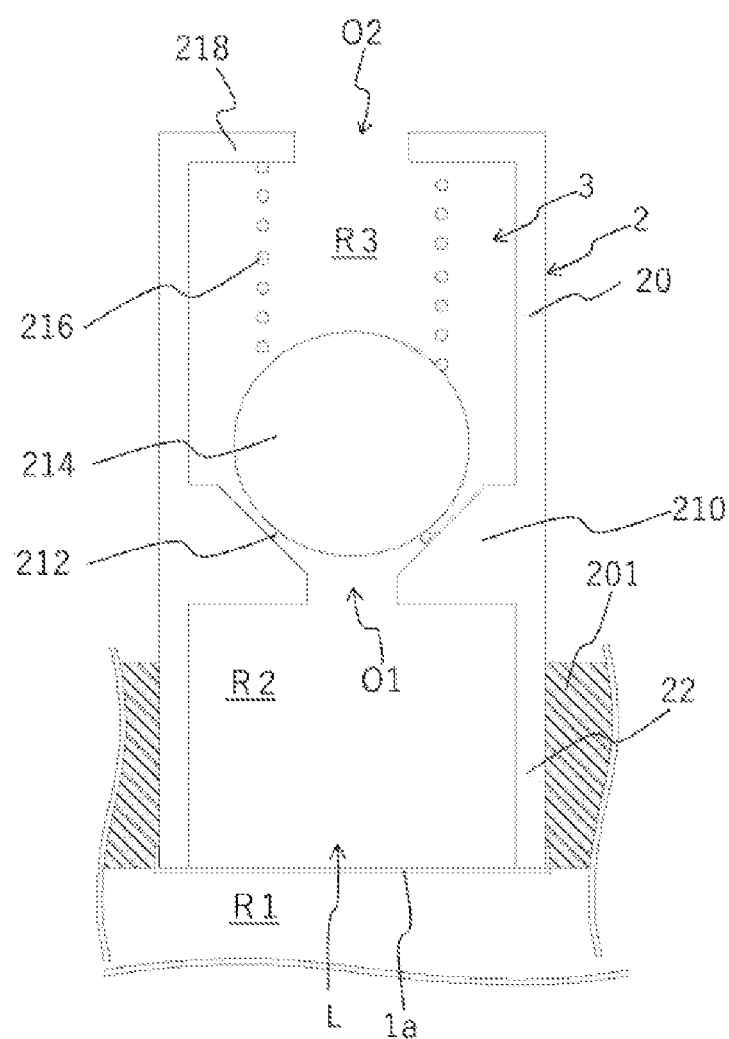
FIG. 4A is a cross-sectional side view showing the structure of the vicinity of a breakable valve and a check valve according to a modified example.
Figure 4B:
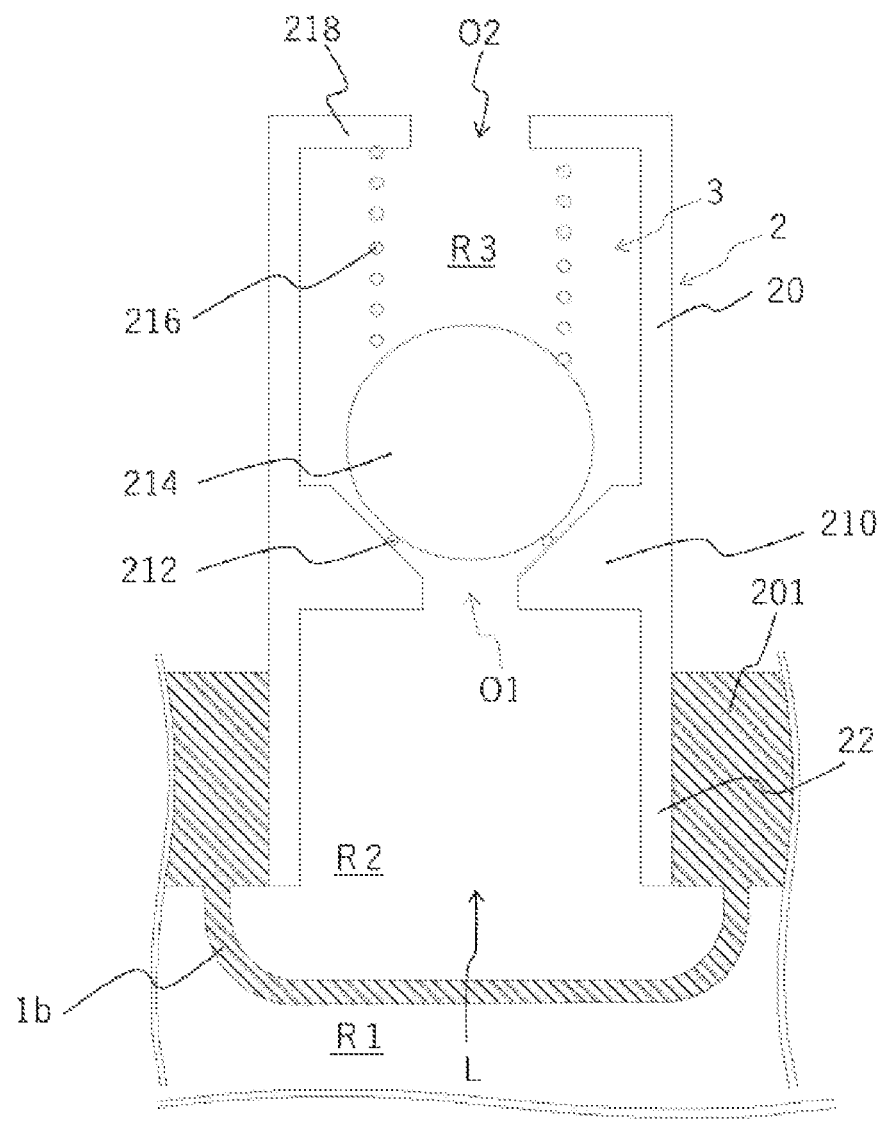
FIG. 4B is a cross-sectional side view showing the structure of the vicinity of a breakable valve and a check valve according to another modified example.

Although a plate-like metal member provided with the scores 10 is used as the breakable valve 1 in the embodiment above, the configuration of the breakable valve 1 is not limited to this aspect. For example, as shown in FIG. 4A, a breakable valve can also be constituted by a laminated film 1a whose outer circumferential edge is heat-sealed to the lower end part of the valve outer body 2. As another example, as shown in FIG. 4B, a breakable valve can also be constituted by a heat-sealed portion 1b that is formed in the packaging container 200 constituted by laminated films so as to surround the lower end part of the valve outer body 2. In this example, the inside and the outside of the heat-sealed portion 1b is separated by the heat-sealed portion 1b such that gas and liquid are not allowed to flow therebetween. However, this heat-sealed portion 1b is configured to come off when pressure of a space on the inner side with respect to the heat-sealed portion 1b increases due to gas generated inside the packaging container 200. As described above, a breakable valve can also be favorably formed as "easy peelable" members as shown in FIG. 4A and FIG. 4B.

4-2

Although the breakable valve 1 is arranged inside the attachment portion 22 in the embodiment above, the breakable valve 1 may also be arranged inside the tubular portion 20. This is preferable because there is a reduced risk that the breakable valve 1 is deformed due to heat generated when performing heat-sealing to attach the attachment portion 22 to the packaging container 200. Moreover, a configuration may also be employed in which the breakable valve 1 is arranged inside the tubular portion 20, the attachment portion 22 having a teary eye shape is omitted, and the packaging container 200 is fixed to the outer circumferential surface of the tubular portion 20 using a heat-sealing technique.

LIST OF REFERENCE NUMERALS

1 Breakable valve
1a Laminated film (breakable valve)
1b Heat-sealed portion (breakable valve)
2 Valve outer body
3 Check valve
200 Packaging container
L Passage

The invention claimed is:

1. A valve for forming a passage through which inside and outside of a packaging container constituted by resin molded articles or films are in communication with each other, the valve comprising:
   a breakable valve that is arranged so as to block the passage and splits open when internal pressure of the packaging container increases due to gas generated inside the packaging container;
   a check valve that is in the passage and on an outer side of the breakable valve with respect to the inside of the packaging container and through which the gas is discharged from the inside of the packaging container to the outside of the packaging container according to internal pressure of the packaging container after the breakable valve has split open;
   an attachment portion that delimits at least a portion of the passage and is fixed to the packaging container through heat-sealing in a state of being sandwiched between the resin molded articles or the films constituting the packaging container; and
   a tubular portion that is arranged outside the packaging container, is continuous with the attachment portion, and delimits another portion of the passage,
   wherein the check valve is arranged inside the tubular portion.

2. The valve according to claim 1, wherein valve-opening pressure for the breakable valve is lower than or equal to two-thirds of withstanding internal pressure of the packaging container.

3. A package comprising:
   the valve according to claim 1; and
   the packaging container.

4. The package according to claim 3, wherein the packaging container is a pouch.

5. The package according to claim 3, wherein the packaging container has a withstanding internal pressure of 1 MPa or less.

6. The package according to claim 3, wherein inside of the packaging container is substantially maintained under vacuum until the breakable valve has split open.

7. The package according to claim 3, wherein the packaging container contains a battery element.

8. The package according to claim 3, wherein the packaging container is a laminated container.

9. A package comprising:
   the valve according to claim 2; and
   the packaging container.

10. The package according to claim 4, wherein the packaging container has a withstanding internal pressure of 1 MPa or less.

11. The package according to claim 4, wherein inside of the packaging container is substantially maintained under vacuum until the breakable valve has split open.

12. The package according to claim 5, wherein inside of the packaging container is substantially maintained under vacuum until the breakable valve has split open.

13. The package according to claim 4, wherein the packaging container contains a battery element.

14. The package according to claim 5, wherein the packaging container contains a battery element.

15. The package according to claim 6, wherein the packaging container contains a battery element.

16. The package according to claim 4, wherein the packaging container is a laminated container.

17. The package according to claim 5, wherein the packaging container is a laminated container.

18. The package according to claim 6, wherein the packaging container is a laminated container.

19. The package according to claim 7, wherein the packaging container is a laminated container.

* * * * *